United States Patent Office 3,706,722
Patented Dec. 19, 1972

3,706,722
POLYMERS FROM ESSENTIALLY WATER-INSOLUBLE UNSATURATED LIQUID MONOMERS AND PROCESS FOR PREPARING SAME
Alfred R. Nelson, Bay City, and Vernon D. Floria, Midland, Mich., assignors to The Dow Chemical Company, Midland, Mich.
Continuation-in-part of application Ser. No. 718,722, Apr. 4, 1968, which is a continuation-in-part of application Ser. No. 642,169, May 29, 1967. This application July 2, 1970, Ser. No. 51,866
Int. Cl. C08f 1/60, 15/32, 1/09
U.S. Cl. 260—85.5 ZA
9 Claims

ABSTRACT OF THE DISCLOSURE

An improvement in the process for preparing polymers from substantially water-insoluble polymerizable ethylenically unsaturated liquid monomer in aqueous suspension wherein such monomers form polymers which are insoluble in their monomer and where the polymerization is first carried out by forming an initial continuous monomer phase which is then polymerized to a maximum conversion of about 20 percent and the polymerization completed following the addition of water in amount sufficient to form a monomer-in-water phase; wherein the improvement consists of conducting the polymerization in the presence of certain, non-ionic, monomer soluble surface active agents which provide for the formation of polymers composed of individual, uniform, substantially spherical porous particles which are devoid of exterior pericellular layer.

BACKGROUND OF THE INVENTION

Figure 1:
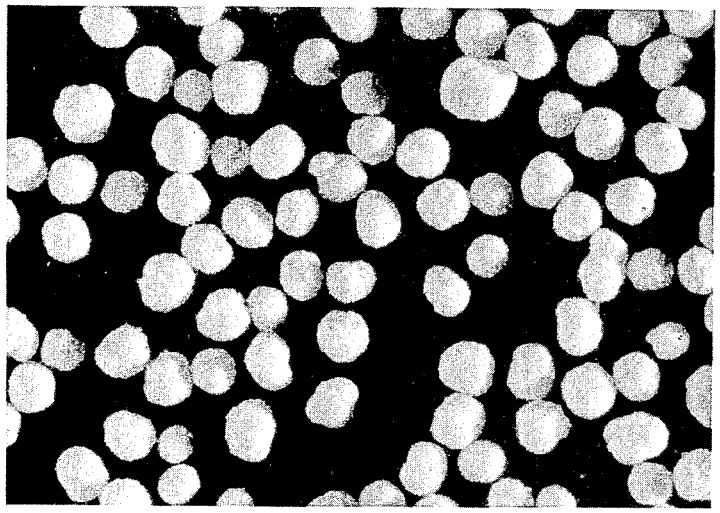

This invention is a continuation-in-part of copending application Ser. No. 718,722 filed Apr. 4, 1968 which is in turn a continuation-in-part of application Ser. No. 642,169 filed May 29, 1967 (now abandoned).

British Patent 748,727 discloses that unitary, homogeneous polymers are prepared from substantially water-insoluble polymerizable ethylenically unsaturated liquid monomer in aqueous dispersion by the following sequential steps:

(1) Forming an initial conversion of monomer to polymer of up to 20 percent by mass polymerization of the monomer in the presence of a monomer soluble catalyst, then (2) Adding sufficient water to the polymerization system to cause a phase inversion wherein water is the continuous phase, and (3) Subjecting the so-formed dispersion to polymerizing conditions to convert essentially all of the remaining liquid monomer to solid polymer.

SUMMARY OF THE INVENTION

It has been discovered, which discovery represents the present invention, that polymers having significantly improved uniformity in porosity, size and structure can be prepared by incorporating in the initial continuous monomer phase at least about 0.1 weight percent, based on the weight of monomer, of certain non-ionic, monomer-soluble surface active agents.

DESCRIPTION OF THE PREFERRED EMBODIMENTS

The surface active agents found to be particularly effective are those which may be generically defined as being selected from the group consisting of the non-ionic monomer soluble esters of fatty acids with glycerol, sorbitol and their polyoxyethylene derivatives such as sorbitan monostearate, sorbitan tristearate, glycerol monooleate, glycerol monostearate, glycerol monopalmitate, sorbitan monooleate and the non-ionic, monomer-soluble multi-valent metal salts of fatty acids, alkyl sulfonates and sulfates such as calcium dilauryl sulfate, zinc dilauryl sulfate, barium distearyl sulfonate and aluminum trilauryl sulfate.

As indicated, the monomers used in the process described herein are those essentially water-insoluble, polymerizable, ethylenically unsaturated liquid monomers which form polymers which are insoluble in their monomer. Examplary of such materials are the vinyl halides such as vinyl chloride and vinyl bromide, the vinylidene halides such as vinylidene chloride, vinyl alkanoates such as vinyl acetate, and acrylonitrile and mixtures thereof. It is to be understood however, that other ethylenically unsaturated monomers may be used in admixture with the above, providing that such admixtures remain essentially insoluble in water and form polymers which are insoluble in their monomers.

The first step in preparing the improved polymers of the present invention consists in obtaining an initial continuous phase of monomer, wherein such continuous phase contains essentially all of the monomer to be polymerized then polymerizing the same to a conversion of monomer to polymer of between about 1 and 20 percent and preferably between about 5 and 12 percent. This is accomplished by polymerizing such monomers in mass or in an initial water-in-monomer dispersion. When utilizing a water-in-monomer dispersion, a relatively small amount generally about 0.1 weight percent based on the amount of water, of a water-soluble suspending agent is used as hereinafter described, and the predominant proportion of monomer is uniformly admixed along with at least about 0.01 weight percent and preferably between about 0.1 and 1 weight percent based on the weight of monomer, of the monomer soluble dispersing agent, and between about 0.1 and 0.5 weight percent of a monomer soluble polymerization initiator.

Exemplary of particularly useful monomer soluble polymerization initiators are isopropyl peroxypercarbonate and lauroyl peroxide. When the water-in-monomer phase is formed, the mixture is heated with agitation, in the absence of oxygen, to a temperature of between about 25° C. and 85° C. and preferably between about 45° C. and 60° C., for a period sufficient to provide the desired conversion of monomer to polymer. When such conversion has been obtained, there is then added to the reaction mixture, with agitation, additional water containing the water-soluble suspending agent, so that upon vigorous agitation, an aqueous dispersion is formed wherein water constitutes the continuous phase. The resulting aqueous dispersion is subjected to the usual polymerizing conditions of time and temperature so that the remaining liquid monomer is essentially completely converted to solid polymer.

The addition of the water solution to the water-in-monomer dispersion or initially mass polymerized monomer may be effected in any suitable manner and in such an amount as to obtain any desired monomer concentration for final polymerization purposes. As previously indicated, at least a sufficient amount of a water-soluble emulsifier is added that upon subsequent agitation, an aqueous dispersion of the remaining monomer is formed wherein water constitutes the continuous phase. Exemplary of particularly useful water-soluble suspending agents are the water-soluble alkyl or hydroxyalkyl alkyl cellulose ethers wherein the alkyl group contains from 1 to 2 carbon atoms and the hydroxyalkyl groups contain from 2 to 4 carbon atoms. Any viscosity grade of these cellulose ethers may be used although it is preferred to use the lower viscosity grades such as 10 cps. to 400 cps. The low viscosity grades of methyl cellulose and methyl hydroxypropyl cellulose are more easily dissolved in water than the higher viscosity grades. By viscosity grade as herein used is meant the viscosity of a 2 percent aqueous solution of the cellulose ether measured at 20° C.

As indicated previously, essentially all of the monomer used in the process must be added when forming the initial continuous monomer phase. It may be desirable however, particularly when providing polymer particles of increased density, to add small amounts of monomer after the formation of the aqueous dispersion where water constitutes the continuous phase.

The polymers obtained according to this invention are characterized by a highly uniform size, shape and porosity; improved bulk density; low gel content; and excellent flow characteristics. More particularly, such polymers are characterized by being highly uniform essentially spherical individual particles having a dry density of between about 0.35 and 0.80 gm./cc. Such particles are further characterized by being essentially free of gels and static charge as well as having excellent particle flow and dry-up properties. Further, it has unexpectedly been found that such particles are characterized by having an outer surface which is of essentially the same structure as the inner surface, i.e. such particles do not have a thickened exterior cell wall which is characteristic of prior known materials. Thus, the polymer particles of this invention are capable of a significantly enhanced, uniform, plasticizer absorption.

Figure 2:
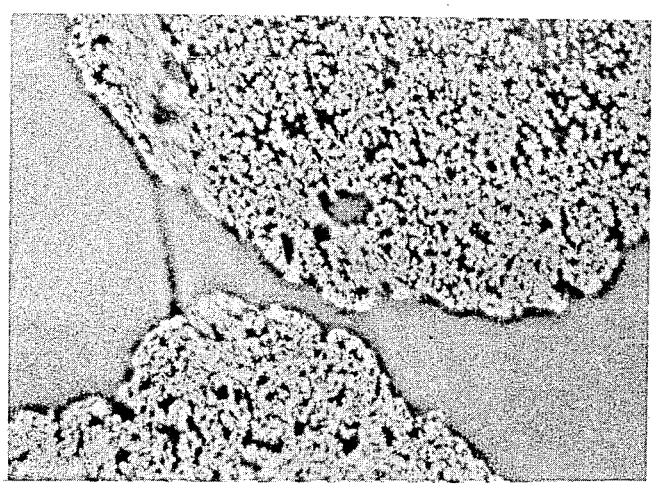
Figure 3:
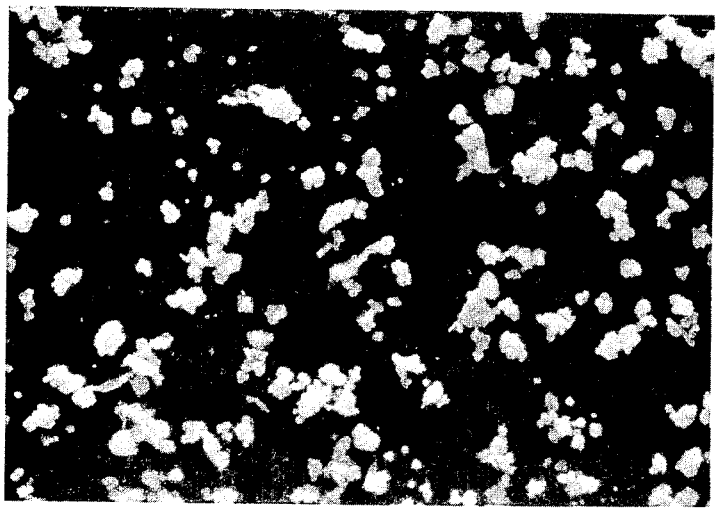
Figure 4:
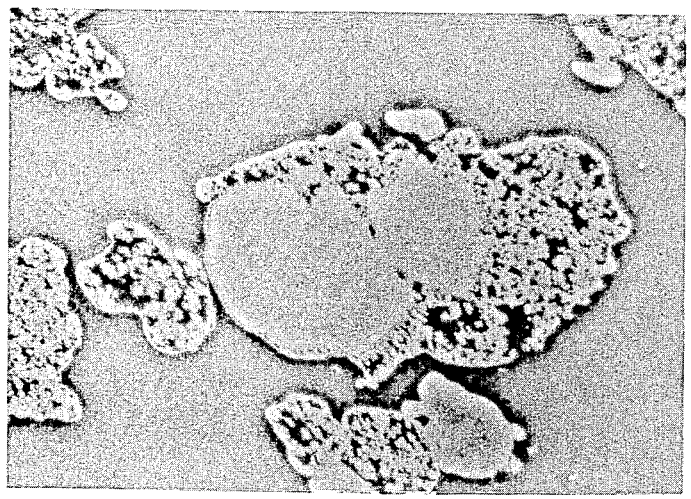

In the accompanying drawings, FIGS. 1 and 2 are electron micrographs which illustrate polymer particles prepared by the process of this invention whereas FIGS. 3 and 4 illustrate polyvinyl chloride polymer particles prepared by conventional aqueous suspension.

The advantages of this invention will be more apparent from the following illustrative examples wherein all parts and percentages are by weight.

Example 1

Into an upright cylindrical polymerization vessel having a capacity of 20 gallons and equipped with an agitator and jacketed for heating and cooling was charged 28 pounds of water, containing 0.1 weight percent of a water-soluble hydroxy propyl methyl cellulose ether having a viscosity of about 500 cps., 0.28 pound of monomer-soluble dispersing agent (sorbitan monostearate) and 5.0 grams of the monomer-soluble polymerization initiator isopropyl percarbonate (added as a 20 percent solution in xylene). The reactor was then evacuated and 56 pounds of vinyl chloride added. The agitator was then turned on and the reactor heated to 50° C. and maintained at that temperature until a conversion of monomer to polymer of about 5 percent was accomplished. Thereafter, 84 pounds of water containing the water-soluble hydroxy propyl methyl cellulose ether was added to the reactor to cause a phase inversion wherein water became the continuous phase.

The reactor was then heated to 55° C. and the reaction continued to a 40 p.s.i.g. pressure drop, after which such reactor was cooled, vented, an emptied. The polymer formed was filtered and dried. This product is hereinafter identified as Run No. 1. The following Table I provides physical property information for such polymer.

By way of comparison, in a separate experiment, a polymer was prepared as described herein but where the water phase was continuous throughout the reaction and the sorbitan monostearate was omitted. This product is designated as Run No. 2. Physical property information for this material is also included in the following Table I.

The data presented in Table I illustrate that the polymer prepared by the process of the present invention (Run No. 1) is characterized by a larger and more uniform particle size, is of a higher porosity as evidenced by its ability to more readily absorb plasticizer, has improved flow properties, and has significantly less gel formation; as compared to polymer prepared in the conventional manner by utilizing water as the continuous phase throughout the reaction (Run No. 2).

TABLE I

|  | Run No. 1, this invention | Run No. 2, for comparison |
|---|---|---|
| Absolute Viscosity | 1.99 | 2.00 |
| Dry density (g./cc.) ASTM D-1755 | .495 | .435 |
| Dry flow (sec./100 cc.) ASTM D-1755 | 5.8 | 8.0 |
| Plasticizer absorb. (pts./100 pts.) ASTM D-1755 | 125 | 107 |
| Plasticized density (g./cc.) ASTM D-1755 | .481 | .343 |
| Plasticized flow (sec./100 cc.) ASTM D-1755 | 8.7 | 21.0 |
| Gels/min. (visual observation of sheeted polymer): | | |
| 4 | 4 | 14 |
| 5 | 1 | 5 |
| 6 | 0 | 2 |
| Screen analysis: | | |
| 20 mesh | 0.1 |  |
| 50 mesh | 27.7 | .3 |
| 70 mesh | 72.2 | 3.3 |
| 100 mesh | 0 | 36.3 |
| 140 mesh | 0 | 45.2 |
| 200 mesh | 0 | 12.8 |
| Pan | 0 | 2.1 |

FIG. 1 shows how the material of this invention looks under an electron microscope when magnified 30 times; FIG. 2 shows an individual particle of such material under an electron microscope when magnified 630 times; FIG. 3 shows the material designated as comparative Run No. 2 under an electron microscope when magnified 30 times; and FIG. 4 shows an individual particle of Run No. 2 under an electron microscope when magnified 630 times.

A comparison of FIGS. 1 and 3 illustrates the highly uniform essentially spherical structure of the polymer particles of the present invention; and a comparison of FIGS. 2 and 4 illustrates that the polymer particles of this invention are characterized by having an outer surface which is of essentially the same structure as the inner surface, i.e., that such particles do not have a thickened exterior cell wall which is characteristic of prior known materials. In FIG. 4, the large opaque areas in the center of the particle are solid polyvinylchloride which gives rise to undesirable "fish-eyes."

Example 2

Several additional experiments were conducted in the manner described as per Run No. 1 utilizing varying types and amounts of monomer soluble dispersing agents. Table II illustrates this data.

TABLE II

Effect of Non-Ionic Monomer Soluble Dispersing Agent

| | Monomer soluble dispersing agent | | Particle size, percent polymer retained on screen of following mesh | | | | |
|---|---|---|---|---|---|---|---|
| Run No. | Type | Percent based on wt. of monomer | 20 | 50 | 70 | 100 | 140 |
| 3 | None | None | 2 | 45 | 30 | 11.5 | 7.5 |
| 4 | Sorbitan tristearate | 0.5 | 0.1 | 27.7 | 7.22 | 0 | 0 |
| 5 | Sorbitan monostearate | 1.0 | 0 | 16 | 82 | 2 | 0 |
| 6 | Calcium dilauryl sulfate | 0.1 | 0.3 | 30.5 | 60.8 | 8.4 | 0 |
| 7 | Reaction product of 1 mole nonyl phenol with 4 moles of ethylene oxides (water soluble) (Dowfax 9N4). | 0.1 | Reaction set-up, i.e. did not produce fine particles | | | | |
| 8 | Reaction product of 1 mole nonyl phenol with 9 moles of ethylene oxide (monomer soluble) (Dowfax 9N9). | 0.1 | Reaction set-up, i.e. did not produce fine particles | | | | |

Microscopic observation of each of the so-formed polymers (Runs 4, 5 and 6) indicate a uniformity in polymer structure characteristic of the polymer identified as Run No. 1.

The data set forth on Table II illustrate that only the prescribed types of non-ionic, monomer soluble surface active agents are capable of providing the advantages of the present invention.

Example 3

Several additional experiments were conducted in the manner as described in Run No. 1 utilizing various monomer combinations. Table III illustrates the monomers used and the particle size distribution of the resulting copolymers.

TABLE III

| Run No. | Monomer type | Amt. (pts. by wgt.) | Polymer part. size, percent polymer retained on screen of mesh | | | | |
|---|---|---|---|---|---|---|---|
| | | | 20 | 50 | 70 | 100 | Pan |
| 9 | Vinylidene chloride plus vinyl chloride. | 73 / 27 | 0 | 73.2 | 18.8 | 6.9 | 1.1 |
| 10 | Vinyl chloride plus vinyl acetate. | 85 / 15 | 0 | 47.1 | 50.5 | 2.4 | 0 |

The above data illustrate the uniformity in particle size which is charactersitic of polymers prepared by the process of this invention. In addition, microscopic observation of each of the so-formed copolymers indicate a uniformity in particle size and structure characteristic of the vinyl chloride polymers prepared by such process as illustrated in Example I and FIGS. 1 and 2.

Example 4

Into a one gallon reactor equipped with an agitator and jacketed for heating and cooling was charged 250 grams of water, containing 0.2 weight percent of a water-soluble hydroxy propyl methyl cellulose ether having a viscosity of about 100 cps.; 5 grams of sorbitan monostearate; 3 grams of isopropyl percarbonate; and 2 grams of lauroyl peroxide. The reactor was evacuated and 1000 grams of vinyl bromide added. The agitator was then turned on and the reactor heated to 50° C. and maintained at that temperature until a conversion of monomer to polymer of about 3 percent was accomplished. Thereafter, 1750 grams of water containing the water-soluble hydroxy propyl methyl cellulose ether was added to cause a phase inversion wherein water became the continuous phase.

The reactor was then heated to 55° C. and the reaction continued to a 40 p.s.i.g. pressure drop, after which the reactor was cooled, vented and emptied and the resulting polymer filtered and dried.

Microscopic observation of this polymer indicated a uniformity in particle size and structure which is characteristic of the vinyl chloride polymer prepared by the process of the invention as illustrated in Example 1 and in FIGS. 1 and 2.

Example 5

Into the one gallon reactor of Example 4 was charged, in the absence of water, 700 grams of vinylidene chloride, 275 grams of vinyl chloride, 25 grams of methyl methacrylate, 15 grams of acrylic acid and a mixture of monomer-soluble polymerization initiators consisting of 2 grams of isopropyl percarbonate and 1.5 grams of lauroyl peroxide added as a 20 percent solution in xylene. The agitator was then turned on and the reactor heated to 50° C. and maintained at that temperature until a conversion of monomers to polymer of about 5 percent was obtained. Thereafter, 1804 grams of water containing 0.2 weight percent of the water-soluble hydroxy methyl cellulose ether of Example 4 was added to the reactor to cause a phase inversion wherein water became the continuous phase.

The reactor was then heated to 55° C. and the reaction continued to about a 40 p.s.i.g. pressure drop, after which the reactor was cooled, vented and emptied and the polymer filtered and dried. Microscopic observation of this material also indicates a uniformity of particle size and structure characteristics of the vinyl chloride polymers prepared by the process of this invention as illustrated in Example 1 and FIGS. 1 and 2.

Example 6

In another experiment, 165 grams of water containing 0.2 weight percent of the water-soluble hydroxy propyl methylcellulose ether of Example 4; 1 gram of isopropyl percarbonate; 730 grams of vinylidene chloride and 270 grams of vinyl bromide were charged into a one gallon reactor and the polymerization reaction completed essentially as set forth in Example 4.

Example 7.—A comparison representing an essential duplication of Run No. 1 but wherein an initial conversion of monomer to polymer of about 25 percent was permitted In a separate experiment, a polymer was prepared essentially by the process of Example 1 (Run No. 1) except that an initial conversion of monomer to polymer of about 25 percent was accomplished wherein the monomer phase formed a solid mass which was not redispersible upon subsequent addition of water with agitation.

Example 8.—Exemplary of the invention using an interpolymer containing acrylonitrile In a separate experiment, a polymer was prepared essentially by the process of Example 1 (Run No. 1) using a monomer charge consisting of 78 weight percent vinylidene chloride and 22 weight percent acrylonitrile. The resulting copolymer was characterized by a uniformity in particle size and structure which is characteristic of the vinyl chloride polymer prepared and described as Run No. 1.

Microscopic observation of the resulting copolymer indicated a uniformity in particle size and structure which is characteristic of the vinyl chloride polymer prepared as described in Example 1 and as illustrated in FIGS. 1 and 2.

What is claimed is:

1. In the process of polymerizing substantially water-insoluble polymerizable ethylenically unsaturated liquid monomer in aqueous dispersion said monomer forming polymers which are insoluble in their monomer by (1) first forming an initial continuous phase consisting of monomer in the presence of a catalyst which is soluble in said monomer then (2) polymerizing such monomer under autogenous pressure at a temperature between about 25 and 85° C. under agitation to provide a conversion of monomer to polymer up to about 20 percent then (3) adding sufficient water to the monomer-polymer mixture with agitation and in the presence of at least about 0.1 weight percent based on the weight of water of a water-soluble suspending agent for said monomer to form a dispersion wherein water is the continuous phase, then (4) polymerizing the so-formed dispersion under autogenous pressures at a temperature between about 25 and 85° C. to convert essentially all of the remaining liquid monomer to solid polymer, the improvement consisting of: polymerizing said monomer in the presence of at least about 0.1 weight percent based on the weight of monomer of a surface active agent which is solubilized in said monomer and which contains too few hydrophilic groups to make it water soluble, said surface active agent being selected from the group consisting of sorbitan monostearate, sorbitan tristearate, glycerol monooleate, glycerol monostearate, glycerol monopalmitate, sorbitan monooleate, calcium dilauryl sulfate, zinc dilauryl sulfate, barium distearyl sulfonate, aluminum trilauryl sulfate and sorbitan monolaurate.

2. The process of claim 1 wherein the initial continuous phase of monomer is substantially water-free.

3. The process of claim 1 wherein the initial continuous phase of monomer is a water-in-monomer dispersion.

4. The process of claim 1 wherein said monomer is vinyl chloride.

5. The process of claim 1 wherein said monomer is a mixture of vinylidene chloride and at least one other ethylenically unsaturated comonomer.

6. The process of claim 5 wherein said monomer is a mixture of vinylidene chloride and vinyl chloride.

7. The process of claim 5 wherein said monomer is a mixture of vinylidene chloride and acrylonitrile.

8. The process of claim 1 wherein said monomer is vinyl bromide.

9. The process of claim 1 wherein the monomer-soluble surface active agent is selected from the group consisting of sorbitan monostearate, sorbitan tristearate, and calcium dilauryl sulfate.

References Cited

UNITED STATES PATENTS

| | | | |
|---|---|---|---|
| 2,566,567 | 9/1951 | Hutchinson | 260—93.5 |
| 2,820,028 | 1/1958 | Wenning | 260—92.8 |
| 3,049,521 | 8/1962 | Burkholder | 260—87.1 |
| 3,055,876 | 9/1962 | Grotz | 260—87.1 |
| 3,439,065 | 4/1969 | Luftglas | 260—880 |
| 3,451,985 | 6/1969 | Mahlo | 260—92.8 |
| 3,522,227 | 7/1970 | Thomas | 260—92.8 |
| 3,007,903 | 11/1961 | Stark | 260—87.7 |

FOREIGN PATENTS

| | | | |
|---|---|---|---|
| 568,347 | 12/1958 | Canada | 260—92.8 |

JOSEPH L. SCHOTER, Primary Examiner

C. A. HENDERSON, Jr., Assistant Examiner

U.S. Cl. X.R.

260—17A, 80 M, 80.77, 85.5 ES, 85.5 XA, 85.5 P, 86.3 R, 87.5 R, 87.7 R, 88.7 G, 89.1 R, 91.7 R, 92.8 W

CERTIFICATE OF CORRECTION

Patent No. 3,706,722     Dated December 19, 1972

Inventor(s) Alfred R. Nelson and Vernon D. Floria

It is certified that error appears in the above-identified patent and that said Letters Patent are hereby corrected as shown below:

Column 3, line 60, the word "an" should be --and--.

Column 4, Table II, line 59, the second figure under the heading "70" which reads "7.22" should be --72.2--.

In the Claims, Claim 3, line 70, the sentence "tinuous phase of monomer is substantially water-free." should be at the end of the claim so that it reads:
--The process of Claim 1 wherein the initial continuous phase of monomer is substantially water-free.--

Signed and sealed this 10th day of July 1973.

(SEAL)
Attest:

EDWARD M. FLETCHER, JR.　　　　Rene Tegtmeyer
Attesting Officer　　　　　　　Acting Commissioner of Patents